(No Model.)

C. T. PALMER.
WHITE LEAD POT.

No. 309,977. Patented Dec. 30, 1884.

Witnesses
Chas. H. Smith
J. Stacy

Inventor
Charles T. Palmer
per Lemuel W. Serrell
atty

UNITED STATES PATENT OFFICE.

CHARLES TOWNSEND PALMER, OF NEW BRUNSWICK, NEW JERSEY.

WHITE-LEAD POT.

SPECIFICATION forming part of Letters Patent No. 309,977, dated December 30, 1884.

Application filed July 31, 1884. (No model.)

*To all whom it may concern:*

Be it known that I, CHARLES TOWNSEND PALMER, of New Brunswick, in the State of New Jersey, have invented an Improvement in White-Lead Pots, of which the following is a specification.

Earthen pots are extensively used in the manufacture of white lead, the same having a receptacle for acetic acid and containing disks or buckles of lead. These pots have heretofore been round, and they have been packed together in a heap and beneath and within a pile of fermenting material, such as horse-dung.

In order to economize space it has been usual to employ two sizes of pots, the pots of small diameter occupying interstices between the pots of large diameter. This necessitates the handling of a large number of pots, and it is difficult to remove the white lead from the small pots.

My improvement is made for lessening the number of pots made use of, for economizing space, and for obtaining a larger yield of white lead from the same sized pile, and for lessening the expense of handling the pots.

Figure 1:
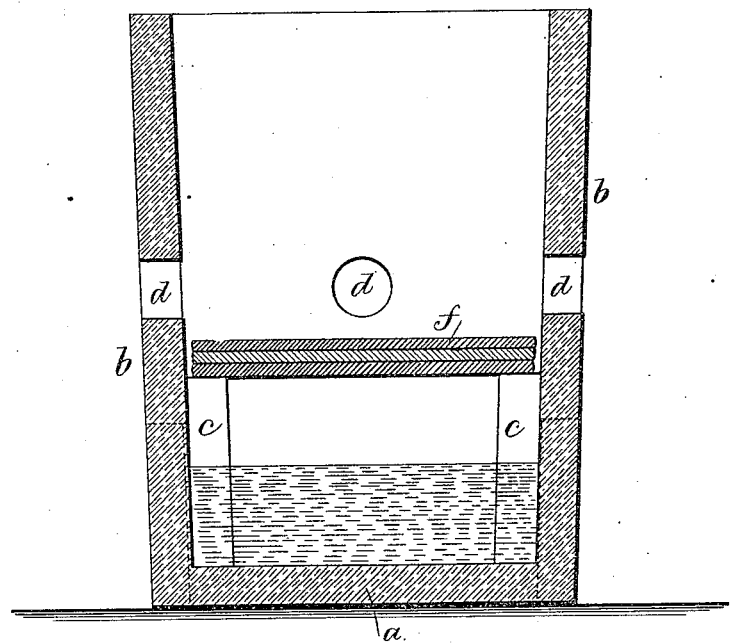
Figure 2:
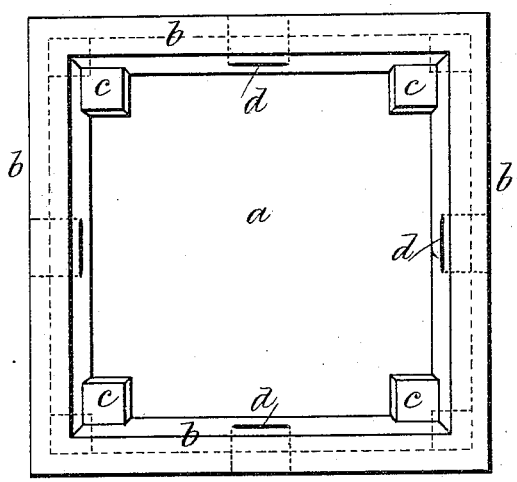

In the drawings, Figure 1 is a vertical section of the pot, and Fig. 2 is a plan of the same.

I make use of a square pot having slightly-tapering sides and ledges in the angles for supporting the sheets, buckles, or pieces of lead, and openings in the sides to admit the carbonic acid to enter and combine with the lead in the presence of the acid-vapors. The pot is composed of the bottom *a*, sides *b b*, and ledges *c c* in the angles of the pot at about one-third the distance between the bottom and the top, and there are openings in the sides of the pot. Usually these will be in the form of holes at *d*. The pots are square, and the sides tapering. This allows for the pots being packed closely together at their top edges, and for the necessary spaces between the sides of the pots for the carbonic-acid gas to pass into the pots. The sheets, buckles, or pieces of lead are placed in the pot, as at *f*, after acetic acid has been introduced into the bottom of the pot. These pieces of lead are of a size to be supported by the ledges, and when the operation is finished the white lead is easily turned out by inverting the pot, because the pot is tapering.

By my improvement I am able to effect a great saving, because the same sized pile of manure will cover much larger quantity of lead. There is no loss of space in the pile, as the pots set as closely together as possible. The number of pots handled for each pile is much less, and the pots pack together and support each other much better than do the ordinary pots, and there is no risk of the pot becoming injured or broken, except by careless handling; and my square pot will hold about twenty-seven per cent. more lead than a round pot of the same diameter. The ledges *c* are preferably made as rectangular tapering projections in the angles. The thickness of the pot may be about the same at the ledges as in the sides, the angles below the ledges being removed on the outsides of the pots.

The well at the bottom of the pot for the reception of acetic acid is about the ordinary depth below the pile of sheets or buckles of lead resting upon the ledges.

I claim as my invention—

A pot for the manufacture of white lead, having a rectangular external and internal configuration, sides that taper slightly, the top of the pot being the largest, and ledges placed above the acetic-acid well for supporting the sheets or buckles of lead, substantially as set forth.

Signed by me this 25th day of July, A. D. 1884.

CHARLES TOWNSEND PALMER.

Witnesses:
T. F. CONNOLLY,
G. H. GRIGGS.